United States Patent
Hayashi et al.

(10) Patent No.: US 9,652,864 B2
(45) Date of Patent: May 16, 2017

(54) THREE-DIMENSIONAL OBJECT RECOGNITION DEVICE AND THREE-DIMENSIONAL OBJECT RECOGNITION METHOD

(71) Applicant: IHI Corporation, Koto-ku (JP)

(72) Inventors: Toshihiro Hayashi, Tokyo (JP); Shuhei Emoto, Tokyo (JP); Mitsuharu Sonehara, Tokyo (JP)

(73) Assignee: IHI Corporation, Koto-ku (JP)

( * ) Notice: Subject to any disclaimer, the term of this patent is extended or adjusted under 35 U.S.C. 154(b) by 0 days.

(21) Appl. No.: 14/703,946

(22) Filed: May 5, 2015

(65) Prior Publication Data
US 2015/0235380 A1    Aug. 20, 2015

Related U.S. Application Data (63) Continuation of application No. PCT/JP2013/080661, filed on Nov. 13, 2013.

(30) Foreign Application Priority Data

Nov. 19, 2012  (JP) ................................ 2012-253023

(51) Int. Cl.
    *G06K 9/00* (2006.01)
    *G06T 7/20* (2017.01)
    (Continued)

(52) U.S. Cl.
    CPC ........ *G06T 7/2086* (2013.01); *G06K 9/00624* (2013.01); *G06K 9/52* (2013.01);
    (Continued)

(58) Field of Classification Search
    None
    See application file for complete search history.

(56) References Cited

U.S. PATENT DOCUMENTS

| | | | |
|---|---|---|---|
| 6,492,986 B1 * | 12/2002 | Metaxas | G06K 9/00335 345/420 |
| 6,529,613 B1 * | 3/2003 | Astle | G01S 3/7864 348/135 |

(Continued)

FOREIGN PATENT DOCUMENTS

| | | |
|---|---|---|
| EP | 2 302 586 A1 | 3/2011 |
| EP | 2 615 582 A1 | 7/2013 |

(Continued)

OTHER PUBLICATIONS

Extended European Search Report issued Oct. 14, 2016 in Patent Application No. 13855733.5.

(Continued)

*Primary Examiner* — Shervin Nakhjavan
(74) *Attorney, Agent, or Firm* — Oblon, McClelland, Maier & Neustadt, L.L.P.

(57) ABSTRACT

A 3D-object recognition device includes: a matching unit to compare a 3D-object in an image based on the image data with a 3D-shape model corresponding to the 3D-object to associate correlated feature points with each other by pattern matching; a model updating unit to update the 3D-shape model based on the feature points associated by the matching unit; a motion estimation unit to estimate motion of the 3D-object based on a history of the position and attitude of the 3D-shape model updated by the model updating unit to estimate a 3D-shape model at an arbitrary time in the future; and a validity determination unit to compare the feature points associated by the matching unit with the 3D-shape model estimated by the motion estimation unit and cause the model updating unit to update the 3D-shape model based on only the feature points determined to be valid.

16 Claims, 5 Drawing Sheets

(51) Int. Cl.
    *G06T 17/10*    (2006.01)
    *G06K 9/62*     (2006.01)
    *G06K 9/52*     (2006.01)
    *G06T 7/00*     (2017.01)
(52) U.S. Cl.
    CPC .......... *G06K 9/6201* (2013.01); *G06T 7/0079* (2013.01); *G06T 17/10* (2013.01)

(56) References Cited

U.S. PATENT DOCUMENTS

| | | | |
|---|---|---|---|
| 6,535,114 B1 | 3/2003 | Suzuki et al. | |
| 2001/0043738 A1* | 11/2001 | Sawhney | G01S 5/163 382/154 |
| 2004/0208341 A1 | 10/2004 | Zhou et al. | |
| 2005/0185826 A1* | 8/2005 | Georgescu | G06K 9/3216 382/103 |
| 2007/0098221 A1* | 5/2007 | Florin | G06K 9/00369 382/103 |
| 2008/0253610 A1* | 10/2008 | Shimizu | G06K 9/00248 382/103 |
| 2008/0273752 A1* | 11/2008 | Zhu | B60W 40/02 382/103 |
| 2009/0015668 A1* | 1/2009 | Tian | G06T 7/0075 348/92 |
| 2009/0141941 A1* | 6/2009 | Wagg | G06T 7/0046 382/103 |
| 2010/0289797 A1* | 11/2010 | Tateno | G06T 7/0046 345/419 |
| 2011/0142283 A1* | 6/2011 | Huang | G06T 7/2006 382/103 |
| 2011/0164114 A1* | 7/2011 | Kobayashi | H04N 13/0253 348/46 |
| 2011/0206274 A1* | 8/2011 | Tateno | G06T 7/0046 382/154 |
| 2012/0114251 A1 | 5/2012 | Solem et al. | |

FOREIGN PATENT DOCUMENTS

| | | | |
|---|---|---|---|
| JP | 08149461 A | * | 6/1996 |
| JP | H08-149458 A | | 6/1996 |
| JP | 2001-005973 A | | 1/2001 |
| JP | 2001-266160 A | | 9/2001 |
| JP | 2006-524534 A | | 11/2006 |
| JP | 2007-219765 A | | 8/2007 |
| JP | 2010-267231 A | | 11/2010 |
| JP | 2011174880 A | * | 9/2011 |
| JP | 2012150796 A | * | 8/2012 |
| WO | WO 2012/033159 A1 | | 3/2012 |

OTHER PUBLICATIONS

International Search Report issued Dec. 10, 2013 for PCT/JP2013/080661 filed on Nov. 13, 2013 with English Translation.

Written Opinion issued Dec. 10, 2013 for PCT/JP2013/080661 filed on Nov. 13, 2013.

F. Terui, et al., "Motion Estimation of Large Space Debris Objects Using Imaging" *The Japan Society of Mechanical Engineers 2002*, pp. 289-290.

C. Poleman, et al., "A Paraperspective Factorization Method for Shape and Motion Recovery," *IEEE Transactions on Pattern Analysis and Machine Intelligence*, vol. 19, No. 3, Mar. 1997, pp. 206-218.

Office Action with Search History issued May 13, 2016 in Canadian Patent Application No. 2,890,717.

Vincenzo Lippiello, et al., "Adaptive extended Kalman filtering for visual motion estimation of 3D objects" Control Engineering Practice, vol. 15, 2007, pp. 123-134.

Office Action issued Aug. 9, 2016 in Japanese Patent Application No. 2012-253023.

* cited by examiner

THREE-DIMENSIONAL OBJECT RECOGNITION DEVICE AND THREE-DIMENSIONAL OBJECT RECOGNITION METHOD

CROSS REFERENCE TO RELATED APPLICATIONS

This application is a continuation application of International Application No. PCT/JP2013/080661, filed on Nov. 13, 2013, which claims priority to Japanese Patent Application No. 2012-253023, filed on Nov. 19, 2012, the entire contents of which are incorporated by references herein.

BACKGROUND OF THE INVENTION

1. Field of the Invention

The present invention relates to a three-dimensional object recognition device and a three-dimensional object recognition method to recognize a three-dimensional object.

2. Description of the Related Art

In recent years, an increasing amount of space debris which is artificial objects served their purposes and revolving in satellite orbits around the earth has become an issue in promoting space development. Such space debris is non-cooperative objects whose movement and attitude are not controlled and may be performing complicated attitude motion such as tumbling motion. When a removal satellite configured to remove space debris approaches space debris, the removal satellite needs to know the accurate position and attitude of the space debris.

The removal satellite needs to take images of the space debris with an imaging unit (a camera) and acquire position relation information and attitude relation information (hereinafter, just referred to as state information collectively) based on some portions of the space debris which are observed in the taken images. Herein, the position relation information shows the relative positional relation between the space debris and removal satellite, and the attitude relation information indicates the relative attitude relation therebetween. As a solution for the state information, factorization has been proposed. In this regard, a paraperspective model in factorization and a weighted factorization method are described in Non Patent Literature 1 (NPL 1): "A paraperspective Factorization Method for Shape and Motion Recovery", IEEE TRANSACTIONS ON PATTERN ANALYSIS AND MACHINE INTELLIGENCE, Vol. 19, No. 3, March 1997, p 206-218.

SUMMARY OF THE INVENTION

When the removal satellite performs the fly-around to orbit around the space debris, a sufficient number of feature points cannot be obtained from the taken images sometimes depending on the attitude of the space debris. For example, when the space debris has a certain relative positional relation with the removal satellite and the sun or has a certain attitude, the area irradiated by sunlight in the surface of the space debris is small while the shadow area is large. A sufficient number of feature points therefore cannot be acquired, and pattern matching cannot be correctly performed between the body of the space debris and a three-dimensional shape model corresponding to the space debris.

The space debris moves while changing the attitude thereof. Accordingly, movement of the feature points at matching cannot be decomposed into movement and a change in attitude of the space debris just by using the technique of the NPL 1, thus sometimes causing an error from real motion.

Moreover, in pattern matching for space debris, the target area of pattern matching is large. Moreover, the surface of the space debris has a simple structure and includes many portions having similar image patterns. The pattern matching therefore sometimes fails. Accordingly, originally same feature points could be determined to be different feature points in some cases, or different feature points could be determined to be same feature points.

In the case of using the result of such matching to form a three-dimensional shape model (to update or add points indicating the shape of the model), once the feature points are updated based on wrong information, incorrect matching is executed based on the wrong information, thus influencing the final result of matching.

In the light of the aforementioned problems, an object of the present invention is to provide a three-dimensional object recognition device and a three-dimensional object recognition method which can increase the accuracy of matching between a three-dimensional object and a three-dimensional shape model and derives state information of the three-dimensional object with high accuracy even when information of feature points is not obtained adequately.

A first aspect of the present invention is a three-dimensional object recognition device including: an imaging unit configured to take images of a search area and generate image data; a matching unit configured to compare a three-dimensional object in an image based on the image data with a three-dimensional shape model corresponding to the three-dimensional object to associate correlated feature points with each other by pattern matching; a model updating unit configured to update the three-dimensional shape model based on the feature points associated by the matching unit; a motion estimation unit configured to estimate motion of the three-dimensional object based on a history of the position and attitude of the three-dimensional shape model updated by the model updating unit to estimate the three-dimensional shape model at an arbitrary time in the future; and a validity determination unit configured to compare the feature points associated by the matching unit with the three-dimensional shape model estimated by the motion estimation unit and cause the model updating unit to update the three-dimensional shape model based on only the feature points determined to be valid.

A second aspect of the present invention is a three-dimensional object recognition device including: an imaging unit configured to take images of a search area and generate image data; a matching unit configured to compare a three-dimensional object in an image based on the image data with a three-dimensional shape model corresponding to the three-dimensional object to associate correlated feature points with each other by pattern matching; a model updating unit configured to update the three-dimensional shape model based on the feature points associated by the matching unit; and a motion estimation unit configured to estimate motion of the three-dimensional object based on a history of the position and attitude of the three-dimensional shape model updated by the model updating unit to estimate the three-dimensional shape model at an arbitrary time in the future. At the arbitrary time in the future, the matching unit compares the three-dimensional object with the three-dimensional shape model estimated by the motion estimation unit.

The motion estimation unit may integrally estimate the three-dimensional shape model.

The motion estimation unit may estimate the three-dimensional shape model on a basis of feature points of segments.

The motion estimation unit may estimate the motion using an extended Kalman filter.

A third aspect of the present invention is a three-dimensional object recognition method including the steps of: taking images of a search area to generate image data; comparing a three-dimensional object in an image based on the image data with a three-dimensional shape model corresponding to the three-dimensional object to associate correlated feature points with each other by pattern matching; comparing the associated feature points with the estimated three-dimensional shape model to extract only feature points determined to be valid; updating the three-dimensional shape model based on the extracted feature points; and estimating motion of the three-dimensional object based on a history of the position and attitude of the updated three-dimensional shape model to estimate the three-dimensional shape model at an arbitrary time in the future.

A fourth aspect of the present invention is a three-dimensional object recognition method including the steps of: taking images of a search area to generate image data; comparing a three-dimensional object in an image based on the image data with a three-dimensional shape model corresponding to the three-dimensional object to associate correlated feature points with each other by pattern matching; updating the three-dimensional shape model based on the associated feature points; and estimating motion of the three-dimensional object based on a history of the position and attitude of the updated three-dimensional shape model to estimate the three-dimensional shape model at an arbitrary time in the future for using the estimated three-dimensional shape model in pattern matching at the arbitrary time in the future.

According to the present invention, it is possible to increase the accuracy of matching between a three-dimensional object and a three-dimensional shape model and derive the state information of the three-dimensional object with high accuracy even when information of feature points cannot be obtained adequately.

DESCRIPTION OF THE PREFERRED EMBODIMENTS

With reference to the accompanying drawings, a description is given of preferred embodiments of the present invention in detail below. The dimensions, materials, other specific numerical values, and the like shown in the embodiments are just shown by way of example for easy understanding of the present invention and do not limit the present invention except as otherwise particularly specified. In the specification and drawings, the components having the substantially same functions and configurations are given the same reference numerals, and overlapping description thereof is omitted. The components which are not directly related to the present invention are not shown in the drawings.

(Removal Satellite 10)

Figure 1:
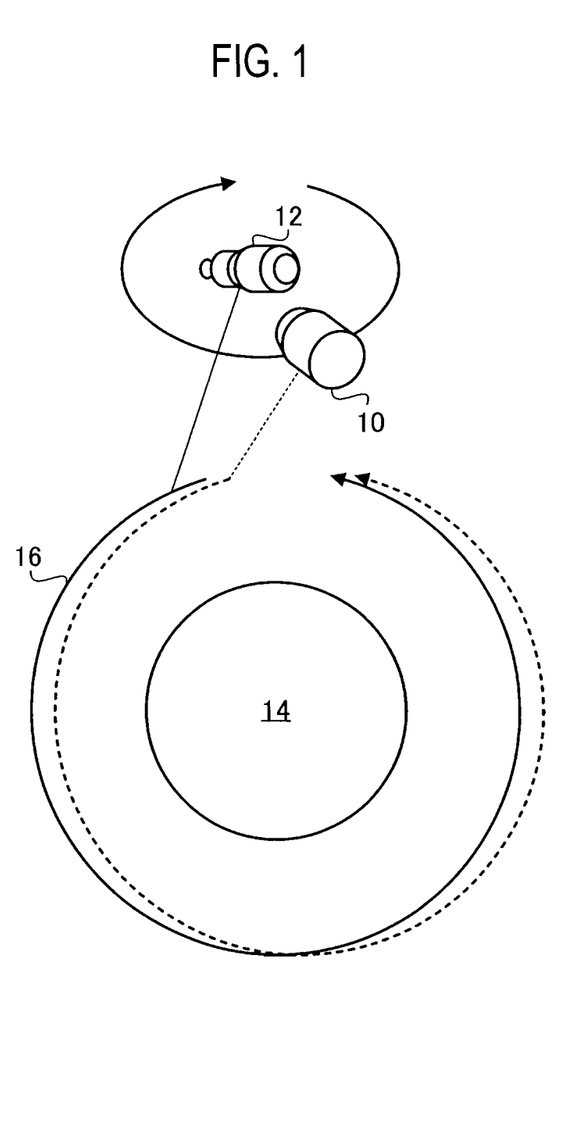
FIG. 1 is an explanatory view illustrating a relative positional relation between space debris and a removal satellite.

FIG. 1 is an explanatory view illustrating the relative positional relationship between space debris 12 and a removal satellite 10. With reference to FIG. 1, the space debris 12 revolves around the earth 14 in a low crowded orbit 16, and the removal satellite 10 revolves around the space debris 12. Herein, the space debris 12 is assumed to be a target three-dimensional object to be recognized, which corresponds to a discarded upper-stage part of a large rocket.

For example, when transiting to an orbit around the space debris 12, the removal satellite 10 performs the fly-around while taking images of the space debris 12 through an imaging device to derive the relative positional relation information and attitude relation information (state information) of the space debris 12 to the removal satellite 10. The removal satellite 10 then catches the target space debris 12 through a catching unit. When the removal satellite 10 performs the fly-around to orbit around the space debris 12 in such a manner, the removal satellite 10 cannot acquire a sufficient number of feature points from the taken images in some cases, depending on the orientation of the space debris 12 relative to the removal satellite 10.

For example, when the removal satellite 10 performs the fly-around to orbit around the space debris 12, depending on the relative positional relation between the space debris 12, the removal satellite 10, and the sun or the attitude of the space debris 12, the area of the surface of the space debris 12 irradiated by sunlight is large in a taken image while the shadow area is small in some cases. In other cases, the area of the surface of the space debris 12 irradiated by sunlight is small in a taken image while the shadow area is small. In the latter case, the removal satellite 10 does not acquire a sufficient number of feature points and cannot perform correct pattern matching between the body of the space debris 12 and a three-dimensional shape model corresponding to the space debris 12. Moreover, since the space debris 12 moves while changing the attitude thereof, it is difficult to accurately specify the positional relation information and attitude relation information. Since the target range of pattern matching is large, the pattern matching is sometimes performed incorrectly. The removal satellite 10 could fail in tracking the space debris 12 as the target or lose sight of the space debris 12 on the way.

Figure 2A:
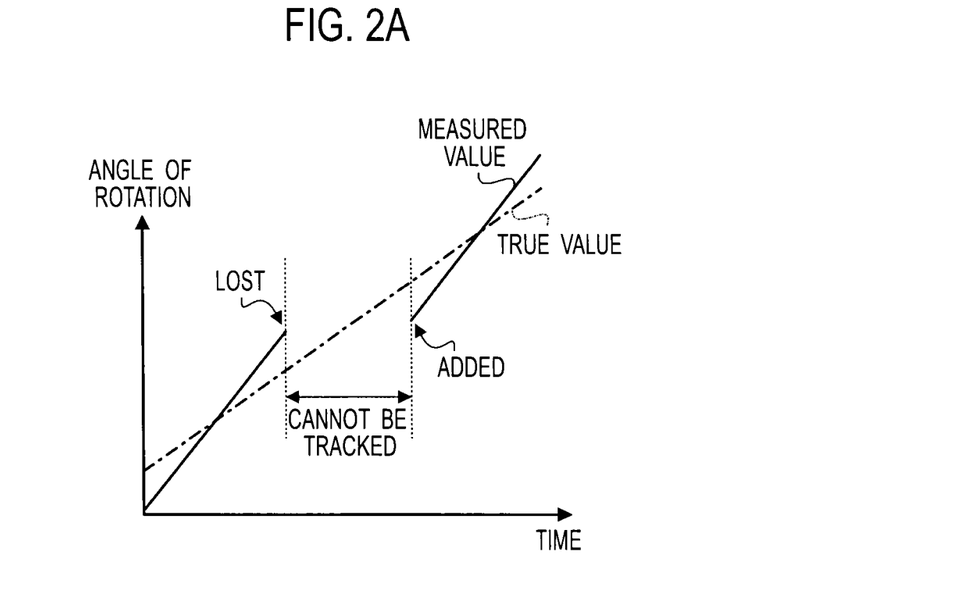
FIG. 2A and FIG. 2B are explanatory diagrams for explaining tracking of the space debris.
Figure 2B:
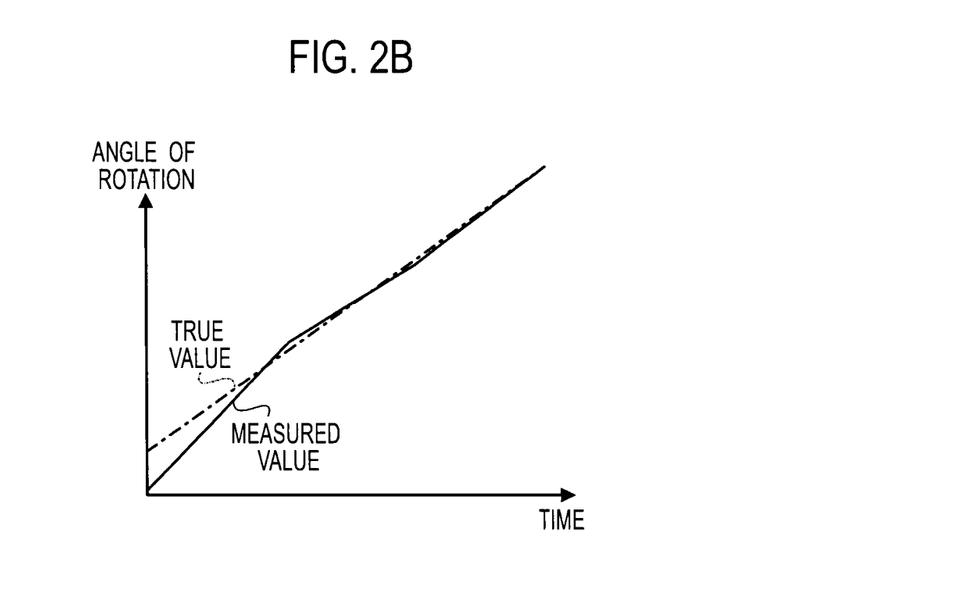

FIG. 2A and FIG. 2B are explanatory diagrams for explaining tracking of the space debris 12. The horizontal axis of each diagram represents time, and the vertical axis represents the angle of rotation about an axis of the space debris 12. Herein, it is assumed that the space debris 12 rotates by the angle of rotation indicated by a dash-dot line in FIG. 2A over time (true values of the angle of rotation). However, the movement of the feature points at matching by the removal satellite 10 cannot be decomposed into movement and a change in attitude of the space debris 12. Accordingly, the measured values of the angle of rotation follow a trajectory different from the true values as indicated by a solid line in FIG. 2A. With reference to FIG. 2A, for example, a feature point which is to be originally tracked like the true values is lost when the error of the angle of rotation becomes large and is then added as anew feature point after a certain period of time.

In this embodiment, therefore, the process to track the space debris 12 as a target three-dimensional object is performed together with a motion estimation process to estimate motion of the space debris 12, so that the accuracy of matching between the space debris 12 and a three-dimensional shape model is increased. When the motion of the space debris 12 is estimated as described above, the position where a feature point moves can be specified with high accuracy, and as indicated by the solid line in FIG. 2B, the measured values of the angle of rotation can be made close to the true values of the angle of rotation indicated by the dash-dot line in FIG. 2B.

Specifically, in this embodiment, the tracking process and three-dimensional reconstruction process for a three-dimensional object (the space debris 12 herein) are performed in parallel. The tracking process calculates the state information of the space debris 12 relative to the imaging unit by associating feature points in a two-dimensional image with feature points of the three-dimensional shape model (pattern matching). In this process, the feature points which have moved or are newly extracted are used in the three-dimensional reconstruction process. The three-dimensional reconstruction process uses the feature points which have moved or are newly extracted to perform three-dimensional reconstruction using the principle of bundle adjustment, thus updating the three-dimensional shape model. The reconstructed three-dimensional shape model is used for motion estimation, and the estimated three-dimensional shape model is used to increase the matching accuracy.

Hereinafter, a description is given of a specific configuration of a three-dimensional object recognition device 100 implementing the aforementioned tracking process and three-dimensional reconstruction process in the removal satellite 10. Thereafter, a description is given of a processing flow of the three-dimensional object recognition method based on a flowchart.

(Three-Dimensional Object Recognition Device 100)

Figure 3:
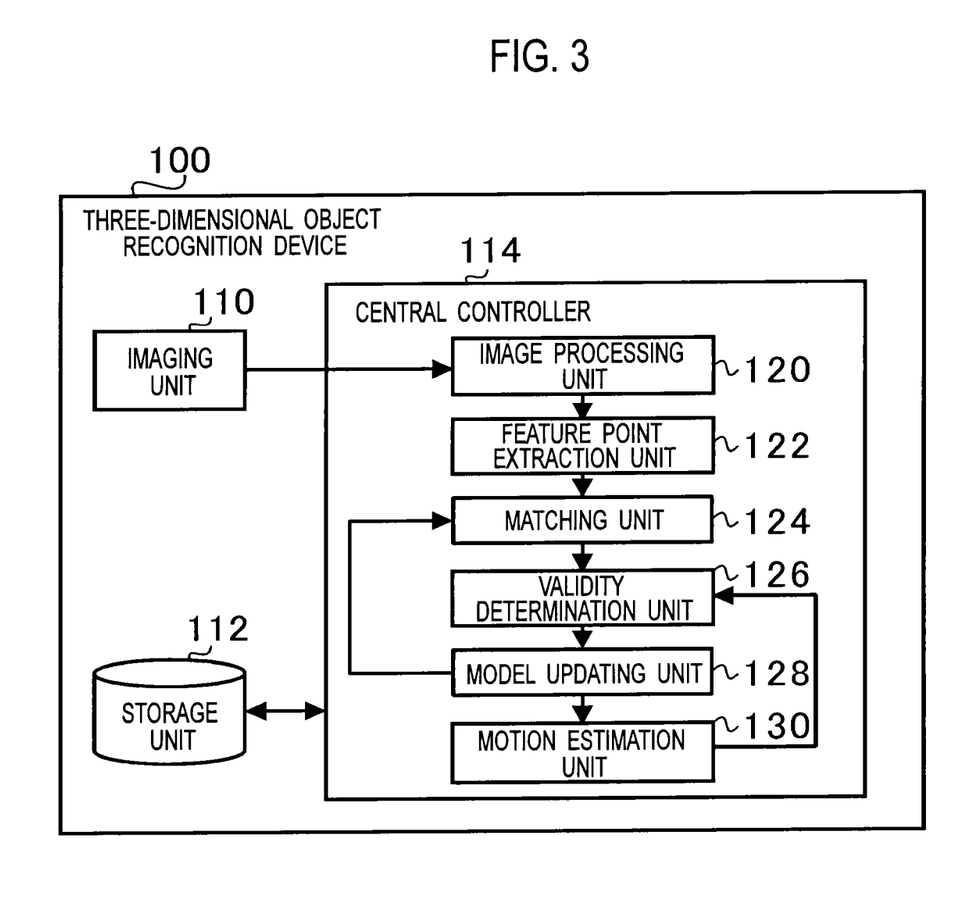
FIG. 3 is a functional block diagram illustrating a schematic configuration of a three-dimensional object recognition device.

FIG. 3 is a functional block diagram illustrating a schematic configuration of the three-dimensional object recognition device 100. The three-dimensional object recognition device 100 includes an imaging unit 110, a storage unit 112, and a central controller 114.

The imaging unit 110 includes an imaging element such as a CCD (a charge-coupled device) or a CMOS (a complementary metal-oxide semiconductor). The imaging unit 110 takes images of a search area and generates image data. In this embodiment, it is assumed that the space debris 12 exists in the images based on the image data.

The state information includes the positional relation information and attitude relation information of the space debris 12 located in the search area relative to the imaging unit 110. The state information can be obtained by using a ranging device such as a laser radar but is obtained by using the imaging unit 110 in this embodiment. This is because the imaging unit 110 is small and lightweight and allows acquisition of the state information at low cost. When the imaging unit 110 is used, a sufficient number of feature points cannot be obtained from the taken images in some cases as described above. In this embodiment, however, by additionally using the motion estimation process, the state information of the three-dimensional object can be specified with high accuracy even from the images taken by the imaging unit 110. When the state information is derived, the absolute position or attitude of any one of the space debris 12 and imaging unit 110 can be specified by specifying the absolute position or attitude of the other one.

Although the image data generated by the imaging unit 110 show two-dimensional images, the object represented in a plane in the image data can be three-dimensionally recognized by changing the relative positional relation between the space debris 12 and imaging unit 110, that is, shifting the imaging unit 110, for example so that image data are generated at plural different viewpoints (angles).

Instead of generating the image data from multiple different viewpoints by the single imaging unit 110, the image data from multiple different viewpoints may be generated simultaneously with plural imaging units 110 which are different in location and imaging direction. The three-dimensional shape of the space debris 12 can be thereby specified based on information at multiple viewpoints, thus shortening the processing time and increasing the specification accuracy.

The storage unit 112 is composed of a SRAM, a DRAM, a flash memory, a hard disk drive (a HDD), and the like and temporarily stores image data generated by the imaging unit 110 and a three-dimensional shape model of the space debris 12.

The central controller 114 is composed of a semiconductor integrated circuit including a central processing unit (CPU), a digital signal processor (DSP), a ROM and a memory storing programs and the like, a RAM as a work area and is configured to manage and control the entire three-dimensional object recognition device 100. In this embodiment, the central controller 114 also functions as an image processing unit 120, a feature point extraction unit 122, a matching unit 124, a validity determination unit 126, a model updating unit 128, and a motion estimation unit 130.

The image processing unit 120 performs image processing for images based on image data generated by the imaging unit 110 before the tracking process of the embodiment. The image processing includes correction of lens distortion of the imaging unit 110 and white balance adjustment.

The feature point extraction unit 122 extracts feature points from the image subjected to the image processing by the image processing unit 120.

Figure 4:
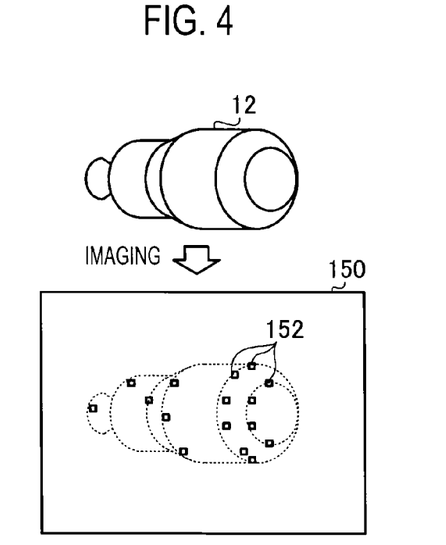
FIG. 4 is an explanatory view for explaining operation of a feature point extraction unit.

FIG. 4 is an explanatory view for explaining the operation of the feature point extraction unit 122. The imaging unit 110 takes images of the space debris 12 and generates image data. The feature point extraction unit 122 extracts vertices (corners) from a two-dimensional image 150 based on the image data already subjected to the image processing and holds the image patterns thereof as feature points 152.

As the extraction method, the Harris algorithm can be used. The Harris algorithm is suitable for detecting corners of an object and the like whose images include density differences. The Harris algorithm is an existing technique and is not described in detail.

The matching unit 124 compares the space debris 12 in the image 150 based on the image data with a three-dimensional shape model of the space debris 12 and performs pattern matching to associate correlated feature points with each other.

Figure 5:
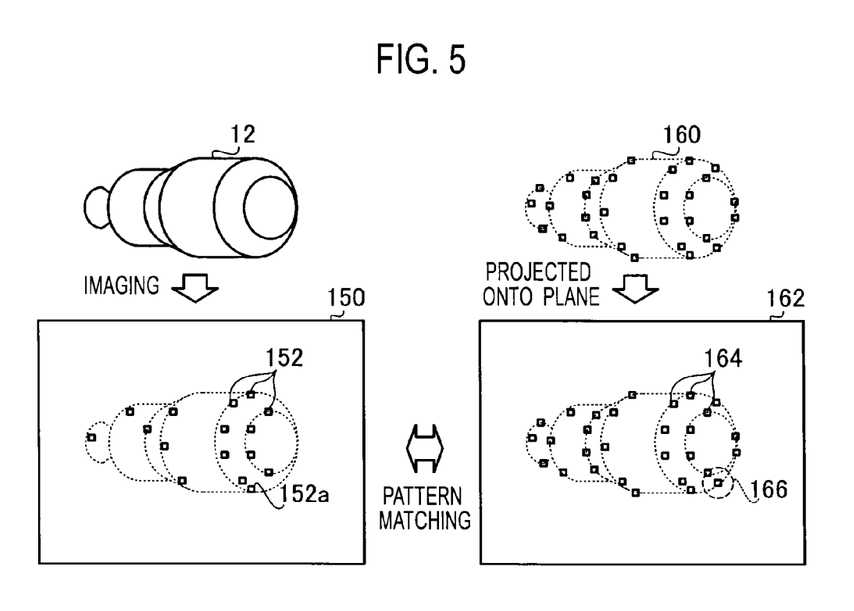
FIG. 5 is an explanatory view for explaining operation of a matching unit.

FIG. 5 is an explanatory view for explaining the operation of the matching unit 124. First, to compare feature points of the three-dimensional shape model 160 with those of the image, the three-dimensional shape model 160 updated by the model updating unit 128 (described later) is projected onto a plane to form a two-dimensional image 162. The matching unit 124 compares each feature point 152 of the space debris 12 extracted by the feature point extraction unit 122 with the two-dimensional image 162, which is formed by planar projection of the three-dimensional shape model 160, to derive feature points (blocks) 164 correlated with the respective feature points 152 from the two-dimensional image 162, which is formed by planar projection of the three-dimensional shape model 160.

In this embodiment, the three-dimensional shape model 160 as the comparison target reflects the previous state information. In other words, the three-dimensional shape model 160 includes the positional relation and attitude relation at the previous imaging process. Accordingly, in the image 150 based on the image data and two-dimensional image 162, the feature points representing the same portion are located relatively close to each other. The matching unit 124 therefore limits the target range of pattern matching to a predetermined range and derives the feature points 164 correlated to the feature points in the image 150 only from the predetermined range. The target range of pattern matching with an arbitrary feature point 152a in the image 150 based on the image data is limited to a range 166 in the two-dimensional image 162, for example.

In such a configuration, the processing load can be made extremely lower than that in the case of searching the entire range of the three-dimensional shape model 160 for correlation with the feature point 152. Moreover, in the space debris 12 including many portions having similar image patterns, different image patterns can be eliminated from the search target. It is therefore possible to avoid such a consequence that the originally same feature points are determined as different feature points or different feature points are determined as the same feature points because of failing pattern matching.

In this embodiment, the feature points 152 are extracted from the image 150 based on the image data, and the extracted feature points 152 are compared with the two-dimensional image 162, which is obtained by planar projection of the three-dimensional shape model 160. However, it may be configured such that the feature points 164 is extracted from a group of points of the three-dimensional shape model 160 and the extracted feature points 164 are compared with the image 150 based on the image data. This can reduce the processing load in some processing procedures.

The validity determination unit 126 compares the feature points 164 associated by the matching unit 124 with the three-dimensional shape model estimated by the motion estimation unit 130 (described later) and determines the validity of the feature points 164.

As described above, the result of matching by the matching unit 124 (the feature points 164) is used to form the three-dimensional shape model in this embodiment. However, once the three-dimensional shape model 160 is updated based on wrong information, matching is incorrectly executed based on the wrong information, thus influencing the final result of matching. In this embodiment, it is determined whether the feature points 164 derived by the matching unit 124 are appropriate to be reflected on the three-dimensional shape model 160 (whether the feature points 164 are valid). Only the feature points 164 which are appropriate to be reflected on the three-dimensional shape model 160 are employed while the other points 164 are eliminated, thus making the three-dimensional shape model 160 appropriate.

Herein, the validity determination unit 126 performs validity determination in the following manner. First, the motion estimation unit 130 (described later) estimates the motion of the space debris 12 to calculate the state information that the three-dimensional shape model 160 specified at the previous imaging process has at the current imaging process. The validity determination unit 126 compares the two-dimensional image 162, which is obtained by planar projection of the estimated three-dimensional model, with the plural feature points 164 determined by the matching unit 124 to be correlated with the same and determines whether the state information including the estimated position and attitude is close to those of each feature point 164. When each obtained motion parameter is included within a predetermined expected range, the validity determination unit 126 recognizes the feature point 164 of interest as a valid feature point. The validity determination is described in detail later.

With reference to the state information of the three-dimensional shape model 160 generated at the previous imaging process, the model updating unit 128 uses the plural feature points 164 determined by the validity determination unit 126 to be valid for three-dimensional reconstruction to update the three-dimensional shape model 160 based on the current imaging process. By further three-dimensionally reconstruction of the positional relations of the valid feature points 164 thus derived in such a manner, it is possible to calculate translation and rotation of the three-dimensional shape model 160, thus minimizing errors.

The three-dimensional shape model 160 is updated using bundle adjustment. The bundle adjustment is a method of reconstructing a three-dimensional shape model from plural two-dimensional images. The bundle adjustment is an existing technique, and the detailed description thereof is omitted.

The motion estimation unit 130 estimates motion of a three-dimensional object based on the history of the position and attitude of the three-dimensional shape model 160 updated by the model updating unit 128 to estimate a three-dimensional shape model at an arbitrary time in the future. In the embodiment, the motion of the space debris 12 is estimated by the extended Kalman filter using the temporal transition of the three-dimensional shape model 160 generated by the model updating unit 128.

In this embodiment, the motion of the feature points 164 is recognized to estimate movement and a change in attitude in addition to pattern matching. This can increase the accuracy at specifying the feature points 164. Moreover, correct matching with the correctly estimated feature points and reconstruction of the three-dimensional shape model 160 based on the correct feature points 164 extracted by matching are repeated. The interaction of the matching and reconstruction can increase the accuracy at matching between the space debris 12 and three-dimensional shape model 160, thus providing the state information of the space debris 12 with high accuracy.

(Explanation of Extended Kalman Filter)

Hereinafter, a description is given of the extended Kalman filter executed by the motion estimation unit 130. Herein, the extended Kalman filter is used to estimate a state amount $X_t$ of the space debris 12.

$$X_t = (P_t Q_t V_t W_t)^T \qquad \text{(Equation 1)}$$

Herein, $P_t$ is the position of the space debris 12; $Q_t$ is the attitude quaternion of the space debris 12; $V_t$ is the speed of the space debris 12; and $W_t$ is the angular speed of the space debris 12. Each parameter is defined by Equation 2 below.

$$P_t = (x_t, y_t, z_t)^T$$

$$Q_t = (q0_t, q1_t, q2_t, q3_t)^T$$

$$V_t = (vx_t, vy_t, vz_t)^T$$

$$W_t = (wx_t, wy_t, wz_t)^T \quad \text{(Equation 2)}$$

Herein, time change of the state amount $X_t$ is defined with a state transition equation f, and Equation 3 below is obtained.

$$X_{t+\Delta t} = f(X_t, \Delta t) \quad \text{(Equation 3)}$$

$$= X_t + \begin{pmatrix} vx_t \\ vy_t \\ vz_t \\ \frac{1}{2}(-wx_t \cdot q1_t - wy_t \cdot q2_t - wz_t \cdot q3_t) \\ \frac{1}{2}(wx_t \cdot q0_t - wy_t \cdot q3_t + wz_t \cdot q2_t) \\ \frac{1}{2}(wx_t \cdot q3_t + wy_t \cdot q0_t - wz_t \cdot q1_t) \\ \frac{1}{2}(-wx_t \cdot q2_t + wy_t \cdot q1_t + wz_t \cdot q0_t) \\ 0 \\ 0 \\ 0 \\ 0 \\ 0 \\ 0 \end{pmatrix} \cdot \Delta t$$

The state transition equation expressed by Equation 3 is based upon the assumption that relative motion of the space debris 12 to the removal satellite 10 is a combination of uniform linear motion and uniform angular velocity rotation motion. Herein, the observation values obtained by image recognition are the position $P_t$ and attitude $Q_t$. Based on the observation values, the velocity $V_t$ and angular velocity $W_t$ are estimated through the extended Kalman filter. By using the estimated velocity $V_t$ and angular velocity $W_t$, the state information of the space debris 12 at an arbitrary time can be estimated through the state transition equation of Equation 3. The estimated values can be used in control of the removal satellite 10, including a trajectory generation for capturing the space debris 12.

The motion estimation unit 130 integrally estimates the entire three-dimensional shape model 160 as described above but may be configured to estimate the three-dimensional shape model 160 on a basis of segments, for example, feature points. The motion estimation processing can be executed for each feature point of the segments, so that the feature points 164 can be specified with higher accuracy.

As described above, in this embodiment, the three-dimensional shape model 160 as the result of motion estimation is fed back to the validity determination, so that update of the three-dimensional shape model 160 cannot be influenced by false recognition.

To be specific, when the motion estimation unit 130 estimates the next positional relation and attitude relation of the three-dimensional shape model through the state transition equation of Equation 3, the result of estimation is used in the validity determination at the next imaging process. The validity determination unit 126 determines the validity by comparing an observation value $Q_{mea}$ of the attitude $Q_t$ with an estimated value $Q_{pre}$ of the attitude at the next imaging time. Herein, an index value M expressed by Equation 4 is calculated.

$$M = (Q_{mea} - Q_{pre})^T \cdot CovQ^{-1} \cdot (Q_{mea} - Q_{pre}) \quad \text{(Equation 4)}$$

CovQ is an expectation of the error variance of the estimated value $Q_{pre}$ calculated by the extended Kalman filter, and the index value M is called Mahalanobis' Distance and is an index value representing how much the observation value $Q_{mea}$ is deviated from the three-dimensional shape model estimated.

In the embodiment, when the index value M specifically increases or decreases, the feature point 164 of interest is determined to be false recognition (invalid) and is eliminated. The threshold to determine false recognition is uniquely set based on the transition of the index value M or the like in a test previously performed using representative image data not causing false recognition, for example. When the feature point 164 is determined to be falsely recognized, the feature point 164 of interest is not used in update of the three-dimensional shape model 160 or the estimation process using the observation value. The three-dimensional shape model 160 is therefore appropriately maintained even in the presence of false recognition. Accordingly, when the optical conditions become better to make visible the feature point 164 which was not visually recognized, the feature point 164 can be recognized again. This can increase the measurement accuracies of the positional relation and attitude relation, thus increasing the accuracy of motion estimation.

The process performed by the matching unit 124 corresponds to the above-described tracking process, and the process to generate the three-dimensional shape model 160 by the model updating unit 128 corresponds to the above-described three-dimensional reconstruction process.

Moreover, a program functioning as the three-dimensional object recognition device 100 through a computer and a storage medium storing the program are provided. Moreover, the program may be loaded from the storage medium to the computer or may be transmitted through a communication network to be loaded to the computer.

(Three-Dimensional Object Recognition Method)

Figure 6:
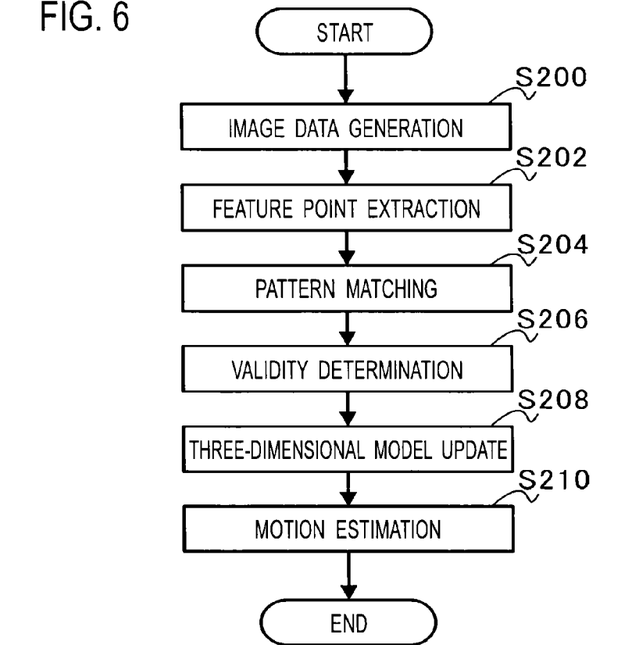
FIG. 6 is a flowchart showing a processing flow of a three-dimensional object recognition method.

FIG. 6 is a flowchart showing the processing flow of the three-dimensional object recognition method. Herein, the three-dimensional object recognition method is executed as interrupt processing executed with a predetermined period. First, the imaging unit 110 of the three-dimensional object recognition device 100 takes images of the search area to generate image data (S200). The feature point extraction unit 122 extracts feature points from the image which is subjected to image processing by the image processing unit 120 (S202). The matching unit 124 compares the feature points extracted by the feature point extraction unit 122 with the three-dimensional shape model corresponding to the space debris 12 to associate correlated feature points with each other by pattern matching (S204).

The validity determination unit 126 compares the associated feature points with the estimated three-dimensional shape model to extract only the feature points determined to be valid (S206). The model updating unit 128 uses the extracted feature points to update the three-dimensional shape model (S208). The motion estimation unit 130 estimates motion of the three-dimensional object based on the history of the position and attitude of the updated three-dimensional shape model to estimate the three-dimensional shape model at an arbitrary time in the future (S210). The thus estimated three-dimensional shape model is used in the validity determination. This can increase the accuracy at matching between the three-dimensional object and the three-dimensional shape model even when the information of the feature points cannot be adequately acquired, thus providing the state information of the three-dimensional object with high accuracy.

(Effect Verification)

By simulation under the observation conditions of fly-around, the motion of the space debris 12 can be estimated within a standard deviation of the angle of rotation of 0.7 degrees. When the image of a certain part of the space debris 12 cannot be obtained by the imaging process for a certain period of time, the error increases to 7 degrees at maximum, but once an image of the part is obtained again, the angle of rotation quickly converges to a true value.

Other Embodiments

In the above description of the embodiment, the validity determination unit 126 uses the result of motion estimation by the motion estimation unit 130. However, the result of motion estimation can be used by the matching unit 124. For example, the motion estimation unit 130 estimates motion of a three-dimensional object based on the history of the position and attitude of the three-dimensional shape model 160 updated by the model updating unit 128 to estimate the three-dimensional shape model at an arbitrary time in the future (at the next imaging process). The matching unit 124 then compares the three-dimensional object in the image 150 based on the image data with the three-dimensional shape model estimated by the motion estimation unit 130 to associate the correlated feature points with each other by pattern matching.

In such a configuration, the estimated three-dimensional shape model 160 as the comparison target reflects the previous state information and is already subjected to the motion estimation process. Accordingly, the feature points representing a same portion in the image 150 based on the image data and the two-dimensional image 162 are located at the substantially same position. Accordingly, when the range which is subjected to pattern matching with an arbitrary feature point 152*a* in the image 150 based on the image data is set smaller than that in the above-described embodiment, invalid feature points are automatically eliminated. Accordingly, the validity determination unit 126 is also unnecessary.

Figure 7:
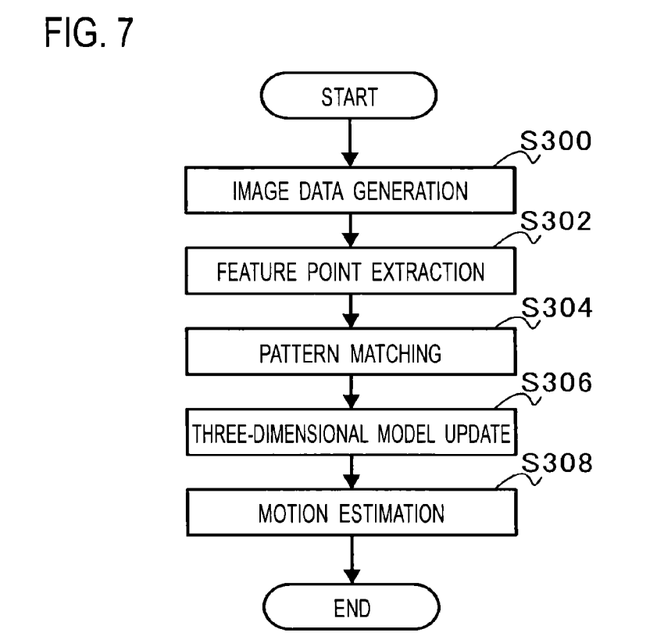
FIG. 7 is a flowchart showing a processing flow of a three-dimensional object recognition method in another embodiment.

FIG. 7 is a flowchart showing the processing flow of the three-dimensional object recognition method in the another embodiment. First, the imaging unit 110 of the three-dimensional object recognition device 100 takes images of the search area to generate image data (S300), and the feature point extraction unit 122 extracts feature points 152 from the image 150 which is subjected to the image processing by the image processing unit 120 (S302). The matching unit 124 compares the feature points 152 extracted by the feature point extraction unit 122 with the three-dimensional shape model corresponding to the space debris 12 to associate the correlated feature points with each other by pattern matching (S304).

The model updating unit 128 updates the three-dimensional shape model 160 based on the extracted feature points (S306). The motion estimation unit 130 estimates motion of the three-dimensional object based on the history of the position and attitude of the three-dimensional shape model 160 updated by the mode updating unit 128 to estimate a three-dimensional shape model at an arbitrary time in the future. The estimated three-dimensional shape model is used in pattern matching at the arbitrary time in the future (S308). This can increase the accuracy in matching between the three-dimensional object and the three-dimensional shape model even when the information of the feature points cannot be adequately obtained, thus providing the state information of the three-dimensional object with high accuracy.

Hereinabove, the preferred embodiments of the present invention are described with reference to the accompanying drawings. However, the present invention is not limited to the embodiments. It is obvious that those skilled in the art can achieve various variations and modifications without departing from the scope of claims, and it is understood that the variations and modifications are within the technical scope of the present invention.

In the above-described embodiments, for example, the three-dimensional object is the space debris 12. However, the three-dimensional object can be various types of existing three-dimensional objects. The above-described embodiment assumes space but is not limited to this case. The present invention is applicable to every field on the earth.

The steps of the three-dimensional recognition method of the specification do not need to be processed in chronological order described in the flowchart and may be performed in parallel or may include processing by a sub-routine.

What is claimed is:

1. A three-dimensional object recognition device, comprising:
   an imaging unit configured to take images of a search area and generate image data;
   a matching unit configured to compare a three-dimensional object in an image based on the image data with a three-dimensional shape model corresponding to the three-dimensional object to associate correlated feature points with each other by pattern matching;
   a model updating unit configured to update the three-dimensional shape model based on the feature points associated by the matching unit;
   a motion estimation unit configured to estimate motion of the three-dimensional object based on a history of the position and attitude of the three-dimensional shape model updated by the model updating unit to estimate a three-dimensional shape model at an arbitrary time in the future; and
   a validity determination unit configured to compare the feature points associated by the matching unit with the three-dimensional shape model estimated by the motion estimation unit and cause the model updating unit to update the three-dimensional shape model based on only the feature points determined to be valid.

2. The three-dimensional object recognition device according to claim 1, wherein the motion estimation unit integrally estimates the three-dimensional shape model.

3. The three-dimensional object recognition device according to claim 2, wherein the motion estimation unit estimates motion using an extended Kalman filter.

4. The three-dimensional object recognition device according to claim 1, wherein the motion estimation unit estimates the three-dimensional shape model on a basis of feature points of segments.

5. The three-dimensional object recognition device according to claim 4, wherein the motion estimation unit estimates motion using an extended Kalman filter.

6. The three-dimensional object recognition device according to claim 1, wherein the motion estimation unit estimates motion using an extended Kalman filter.

7. A three-dimensional object recognition device, comprising:
   an imaging unit configured to take images of a search area and generate image data;

a matching unit configured to compare a three-dimensional object in an image based on the image data with a three-dimensional shape model corresponding to the three-dimensional object to associate correlated feature points with each other by pattern matching;

a model updating unit configured to update the three-dimensional shape model based on the feature points associated by the matching unit; and a motion estimation unit configured to estimate motion of the three-dimensional object based on a history of the position and attitude of the three-dimensional shape model updated by the model updating unit to estimate the three-dimensional shape model at an arbitrary time in the future, wherein at the arbitrary time in the future, the matching unit compares the three-dimensional object with the three-dimensional shape model estimated by the motion estimation unit.

8. The three-dimensional object recognition device according to claim 7, wherein the motion estimation unit integrally estimates the three-dimensional shape model.

9. The three-dimensional object recognition device according to claim 8, wherein the motion estimation unit estimates motion using an extended Kalman filter.

10. The three-dimensional object recognition device according to claim 7, wherein the motion estimation unit estimates the three-dimensional shape model on a basis of feature points of segments.

11. The three-dimensional object recognition device according to claim 10, wherein the motion estimation unit estimates motion using an extended Kalman filter.

12. The three-dimensional object recognition device according to claim 7, wherein the motion estimation unit estimates motion using an extended Kalman filter.

13. A three-dimensional object recognition method, comprising the steps of:

taking images of a search area to generate image data;

comparing a three-dimensional object in an image based on the image data with a three-dimensional shape model corresponding to the three-dimensional object to associate correlated feature points with each other by pattern matching;

comparing the associated feature points with the estimated three-dimensional shape model to extract only feature points determined to be valid;

updating the three-dimensional shape model based on the extracted feature points; and estimating motion of the three-dimensional object based on a history of the position and attitude of the updated three-dimensional shape model to estimate the three-dimensional shape model at an arbitrary time in the future.

14. A three-dimensional object recognition method, comprising the steps of:

taking images of a search area to generate image data;

comparing a three-dimensional object in an image based on the image data with a three-dimensional shape model corresponding to the three-dimensional object to associate correlated feature points with each other by pattern matching;

updating the three-dimensional shape model based on the feature points associated by pattern matching; and estimating motion of the three-dimensional object based on a history of the position and attitude of the updated three-dimensional shape model to estimate the three-dimensional shape model at an arbitrary time in the future for using the estimated three-dimensional shape model in pattern matching at the arbitrary time in the future.

15. A three-dimensional object recognition device, comprising:

a camera configured to take images of a search area and generate image data; and circuitry configured to compare a three-dimensional object in an image based on the image data with a three-dimensional shape model corresponding to the three-dimensional object to associate correlated feature points with each other by pattern matching;

update the three-dimensional shape model based on the feature points associated by the matching unit;

estimate motion of the three-dimensional object based on a history of the position and attitude of the three-dimensional shape model updated by the circuitry to estimate a three-dimensional shape model at an arbitrary time in the future; and compare the feature points associated by the circuitry with the three-dimensional shape model estimated by the circuitry and to update the three-dimensional shape model based on only the feature points determined to be valid.

16. A three-dimensional object recognition device, comprising:

a camera configured to take images of a search area and generate image data; and circuitry configured to:

compare a three-dimensional object in an image based on the image data with a three-dimensional shape model corresponding to the three-dimensional object to associate correlated feature points with each other by pattern matching;

update the three-dimensional shape model based on the feature points associated by the circuitry; and a estimate motion of the three-dimensional object based on a history of the position and attitude of the three-dimensional shape model updated by the circuitry to estimate the three-dimensional shape model at an arbitrary time in the future, wherein at the arbitrary time in the future, the circuitry compares the three-dimensional object with the three-dimensional shape model estimated by the circuitry.

* * * * *